United States Patent
Goto et al.

(10) Patent No.: US 12,391,285 B2
(45) Date of Patent: Aug. 19, 2025

(54) VEHICLE CONTROL DEVICE, STORAGE MEDIUM STORING COMPUTER PROGRAM FOR VEHICLE CONTROL, AND METHOD FOR CONTROLLING VEHICLE

(71) Applicants: TOYOTA JIDOSHA KABUSHIKI KAISHA, Toyota (JP); DENSO CORPORATION, Kariya (JP)

(72) Inventors: Kunio Goto, Tokyo-to (JP); Ryusuke Kuroda, Tokyo-to (JP); Takuya Fujiki, Tokyo-to (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 160 days.

(21) Appl. No.: 18/448,379

(22) Filed: Aug. 11, 2023

(65) Prior Publication Data

US 2024/0067227 A1    Feb. 29, 2024

(30) Foreign Application Priority Data

Aug. 25, 2022  (JP) .................................. 2022-134081

(51) Int. Cl.
   *B60W 60/00*    (2020.01)
   *B60W 40/04*    (2006.01)

(52) U.S. Cl.
   CPC ........ *B60W 60/0051* (2020.02); *B60W 40/04* (2013.01); *B60W 2520/10* (2013.01)

(58) Field of Classification Search
   CPC ............ B60W 60/0051; B60W 40/04; B60W 2520/10; B60W 2552/10; B60W 2556/50; B60W 30/182; B60W 2554/4042; B60W 2554/408; B60W 40/105
   See application file for complete search history.

(56) References Cited

U.S. PATENT DOCUMENTS

| | | | |
|---|---|---|---|
| 2015/0170514 A1* | 6/2015 | Stenneth | G08G 1/0125 |
| 2018/0113450 A1* | 4/2018 | Sherony | G05D 1/0022 |
| 2019/0189004 A1* | 6/2019 | Suzuki | G08G 1/0133 |
| 2019/0367034 A1 | 12/2019 | Okajima et al. | |
| 2020/0257294 A1* | 8/2020 | Ishioka | G05D 1/0088 |
| 2022/0319309 A1* | 10/2022 | Al-Nadawi | G08G 1/0133 |
| 2023/0166754 A1* | 6/2023 | Okuno | B60W 50/14 |
| 2023/0177963 A1* | 6/2023 | Joo | G08G 1/167 |

FOREIGN PATENT DOCUMENTS

| | | |
|---|---|---|
| JP | 2003288674 A | 10/2003 |
| JP | 2004272839 A | 9/2004 |
| WO | 2018138768 A1 | 1/2017 |

* cited by examiner

*Primary Examiner* — Ramya P Burgess
*Assistant Examiner* — Brittany Renee Peko
(74) *Attorney, Agent, or Firm* — Dickinson Wright, PLLC

(57) ABSTRACT

A vehicle control device has a processor configured to calculate an average speed of a vehicle traveling in a traffic lane and another vehicle in a predetermined range from the vehicle, for each of multiple traffic lanes of a traveling road on which the vehicle is traveling, as a traffic lane average speed, to determine whether the traffic lanes are congested based on the traffic lane average speed for each of the multiple traffic lanes of the traveling road and to estimate whether the traveling road as a whole is congested based on a proportion of traffic lanes of the traveling road that are congested, and to decide to drive the vehicle by automatic control when the traveling road as a whole is congested.

7 Claims, 12 Drawing Sheets

|  | LEFT TRAFFIC LANE | TRAVELING LANE | PASSING LANE |
|---|---|---|---|
| AVERAGE VALUE FOR TRAFFIC LANE AVERAGE SPEED (KM/S) | 50 | 70 | 90 |
| REFERENCE DECREASE | 15 | 21 | 30 |
| REFERENCE SPEED VALUE (KM/S) | 35 | 49 | 60 |

VEHICLE CONTROL DEVICE, STORAGE MEDIUM STORING COMPUTER PROGRAM FOR VEHICLE CONTROL, AND METHOD FOR CONTROLLING VEHICLE

FIELD

The present disclosure relates to a vehicle control device, a storage medium storing a computer program for vehicle control, and a method for controlling a vehicle.

BACKGROUND

Vehicle-mounted automatic control systems acquire vehicle status information such as speed using a sensor mounted in the vehicle, and control operation of the vehicle based on the vehicle status information. For example, an automatic control system detects the flow of vehicles in a traveling lane in which the vehicle is traveling based on the vehicle speed, and begins automatic control of the vehicle when the speed of the vehicle falls below a predetermined reference speed. This can release the driver from the burden of driving the vehicle when the road is congested, for example.

When the road on which the vehicle is traveling has multiple lanes, the flow of vehicles may differ depending on the traffic lane.

For example, Japanese Unexamined Patent Publication No. 2003-288674 proposes a traffic congestion determining device that uses a millimeter wave sensor installed on a road to measure vehicle speeds, and calculates the average speed for the road as a whole from the number of vehicles passing on each lane and the total speed within the measuring range, determining that the road is congested when the average speed for the road as a whole is lower than a traffic congestion speed.

SUMMARY

However, since vehicle speeds differ between passing lanes and traffic lanes that are not passing lanes, it is possible that an accurate judgment of the state of a road with multiple lanes cannot be made when traffic congestion is determined based on the average speed of the road as a whole.

It is therefore an object of the present disclosure to provide a vehicle control device that estimates the overall state of the road on which the vehicle is traveling based on the average speed of each of its multiple lanes, and can appropriately reflect the state of the road as a whole for controlling the vehicle.

(1) One embodiment of the invention provides a vehicle control device. The vehicle control device has a processor configured to calculate an average speed of a vehicle traveling in a traffic lane and another vehicle in a predetermined range from the vehicle, for each of multiple traffic lanes of a traveling road on which the vehicle is traveling, as a traffic lane average speed, determine whether the traffic lanes are congested based on the traffic lane average speed for each of the multiple traffic lanes of the traveling road and estimate whether the traveling road as a whole is congested based on a proportion of traffic lanes of the traveling road that are congested, and decide to drive the vehicle by automatic control when the traveling road as a whole is congested.

(2) In the vehicle control device of (1), it is preferable that the processor is further configured to determine, for each of the multiple traffic lanes of the traveling road, that the traffic lane is congested when the traffic lane average speed is at or below a reference speed value set for each traffic lane.

(3) In the vehicle control device of (2), it is preferable that the processor is further configured to set the reference speed value for each traffic lane based on the average value for the traffic lane average speed between predetermined reference time points, for each of the multiple traffic lanes of the traveling road.

(4) In the vehicle control device of (2) or (3), it is preferable that the processor is further configured to increase the reference speed value for each of the multiple traffic lanes of the traveling road, when a branching location where another road branches from the traveling road is within a first range from the current location of the vehicle toward the traveling direction.

(5) In the vehicle control device of any of (2) to (4), it is preferable that the processor is further configured to decrease the reference speed value for each of the multiple traffic lanes of the traveling road, when a merging location where another road merges with the traveling road is within a second range from the current location of the vehicle toward the traveling direction.

(6) According to another embodiment, a computer-readable, non-transitory storage medium is provided which stores a computer program for vehicle control. The computer program for vehicle control causes a processor to execute a process, and the process includes calculating an average speed of a vehicle traveling in a traffic lane and another vehicle in a predetermined range from the vehicle, for each of multiple traffic lanes of a traveling road on which the vehicle is traveling, as a traffic lane average speed, determining whether the traffic lanes are congested based on the traffic lane average speed for each of the multiple traffic lanes of the traveling road and estimating whether the traveling road as a whole is congested based on a proportion of traffic lanes of the traveling road that are congested and deciding to drive the vehicle by automatic control when the traveling road as a whole is congested.

(7) Another embodiment of the invention provides a method for controlling a vehicle. The method for controlling a vehicle is carried out by a vehicle control device and includes calculating an average speed of a vehicle traveling in a traffic lane and another vehicle in a predetermined range from the vehicle, for each of multiple traffic lanes of a traveling road on which the vehicle is traveling, as a traffic lane average speed, determining whether the traffic lanes are congested based on the traffic lane average speed for each of the multiple traffic lanes of the traveling road and estimating whether the traveling road as a whole is congested based on a proportion of traffic lanes of the traveling road that are congested and deciding to drive the vehicle by automatic control when the traveling road as a whole is congested.

Since the vehicle control device of the disclosure estimates the overall state of the road on which the vehicle is traveling based on the average speed of each of its multiple lanes, it can appropriately reflect the overall state of the road for controlling the vehicle.

The object and advantages of the invention will be realized and attained by means of the elements and combinations particularly pointed out in the claims. It is to be understood that both the foregoing general description and

DESCRIPTION OF EMBODIMENTS

Figure 1:
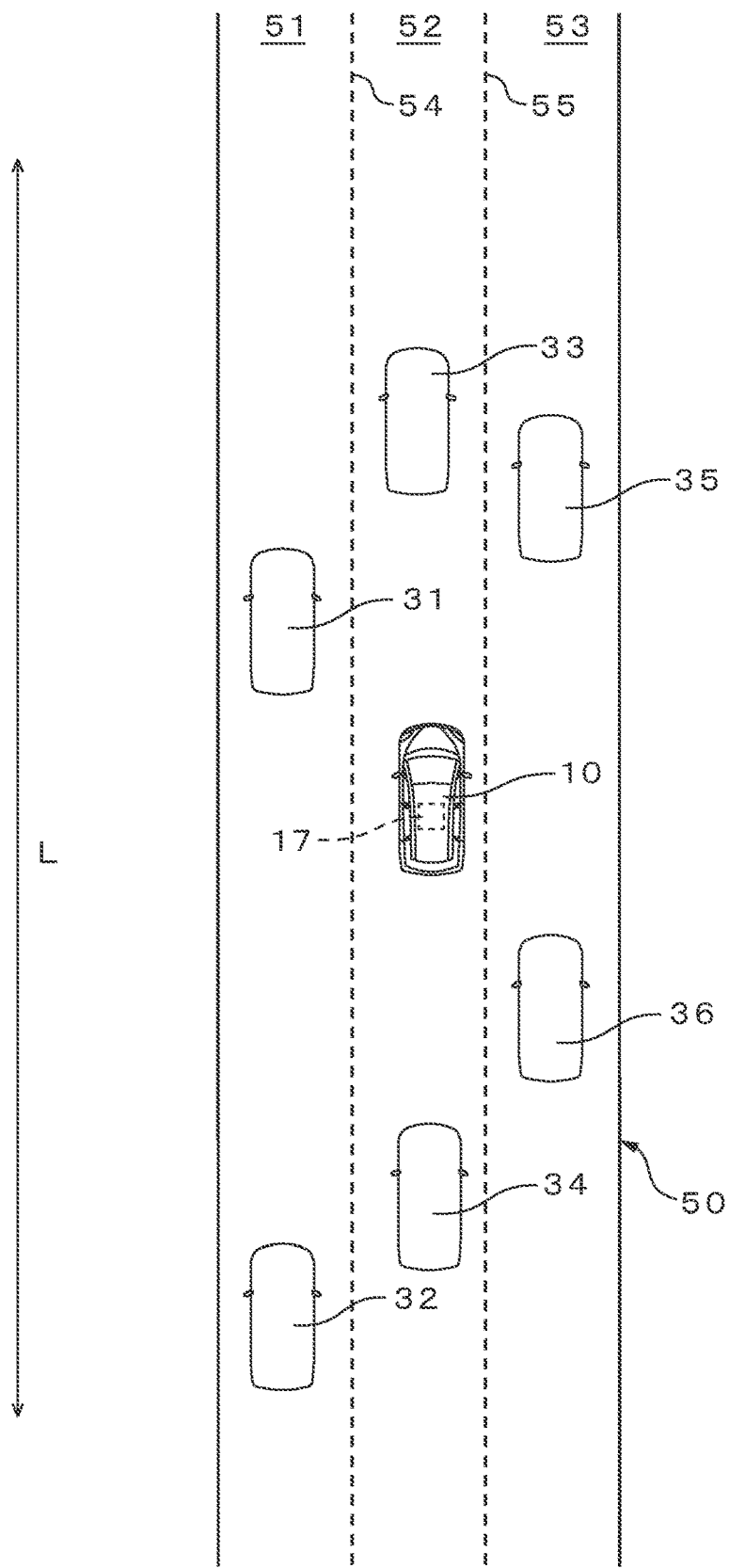
FIG. 1 is a diagram illustrating in overview the operation of a vehicle control system having a traffic congestion determining device of the embodiment.

FIG. 1 is a diagram illustrating in overview the operation of a vehicle control system having a traffic congestion determining device 17 of the embodiment. The traffic congestion determining device 17 is an example of the vehicle control device. Operation relating to traffic congestion determination processing by the traffic congestion determining device 17 disclosed herein will now be described in overview with reference to FIG. 1.

The vehicle 10 has an automatic control operating mode in which the vehicle 10 is operated by automatic control, and a manual control operating mode in which the driver operates the vehicle manually. The vehicle 10 is currently being controlled in the manual control operating mode, with the driver operating the vehicle 10. The vehicle 10 may also be an autonomous vehicle.

The vehicle 10 is traveling on one traffic lane 52 of the road 50 having traffic lanes 51, 52, 53. The traffic lane 51 and traffic lane 52 are divided by a lane marking line 54, and the traffic lane 52 and traffic lane 53 are divided by a lane marking line 55.

The traffic lane 51 is the lane to the left of the traffic lane 52 in which the vehicle 10 is traveling, with other vehicles 31, 32 traveling in the traffic lane 51. Another vehicle 33 is located ahead of the vehicle 10 in the traffic lane 52 in which the vehicle 10 is traveling, and another vehicle 34 is also located behind the vehicle 10. The traffic lane 53 is a passing lane, and other vehicles 35, 36 are traveling in the traffic lane 53.

The traffic congestion determining device 17 of the vehicle 10 uses a sensor mounted in the vehicle 10 to acquire vehicle status information for the vehicle 10, and to calculate the speed of the vehicle 10 traveling in the traffic lane 52.

The traffic congestion determining device 17 also uses a sensor mounted in the vehicle 10 to acquire surrounding environment information for the vehicle 10, and based on the information, calculates the speeds of the other vehicles traveling in the traffic lanes 51, 52, 53, within a predetermined range L from the vehicle 10.

The traffic congestion determining device 17 calculates the average speed of the other vehicles 31, 32 traveling in the traffic lane 51, as the average speed for the traffic lane 51. The traffic congestion determining device 17 also calculates the average speed of the vehicle 10 and the other vehicles 33, 34 traveling in the traffic lane 52, as the average speed for the traffic lane 52. The traffic congestion determining device 17 further calculates the average speed of the other vehicles 35, 36 traveling in the traffic lane 53, as the average speed for the traffic lane 53.

The traffic congestion determining device 17 determines whether or not the traffic lanes are congested based on the traffic lane average speed for each of the three traffic lanes 51, 52, 53 of the road 50. In the example shown in FIG. 1, the traffic congestion determining device 17 determines that each of the three traffic lanes 51, 52, 53 of the road 50 are congested.

The traffic congestion determining device 17 also estimates whether or not the entire road 50 is congested, based on the proportion of congested traffic lanes in the traveling road 50. In the example shown in FIG. 1, all of the traffic lanes 51, 52, 53 of the road 50 are congested, and therefore the traffic congestion determining device 17 estimates that the road 50 as a whole is congested.

Since the road 50 as a whole is congested, the traffic congestion determining device 17 decides to operate the vehicle 10 by the automatic control and selects control of the vehicle 10 by the automatic control operating mode. The traffic congestion determining device 17 notifies the driver that the operation will switch from the manual control operating mode to the automatic control operating mode, and begins operating the vehicle 10 in the automatic control operating mode.

When the entire road 50 is not congested, on the other hand, the traffic congestion determining device 17 selects the control of the vehicle 10 by the manual control operating mode. The vehicle 10 continues the current state of the operation in the manual control operating mode.

For example, even with a high average speed of the traffic lane 52 in which the vehicle 10 is traveling, it can happen that the average speed in the traffic lane 53 which is a passing lane is actually decreasing, leading to start of traffic congestion for the entire road. In such cases, the traffic congestion determining device 17 is able to rapidly detect that traffic congestion is starting for the entire road.

Since the traffic congestion determining device 17 estimates the state of the entire road 50 based on the average speed of each of the multiple traffic lanes 51, 52, 53 of the road 50, the traffic congestion determining device 17 can rapidly detect start of congestion for the road 50 as a whole, allowing the control of the vehicle 10 to appropriately reflect the state of the road 50 as a whole.

Figure 2:
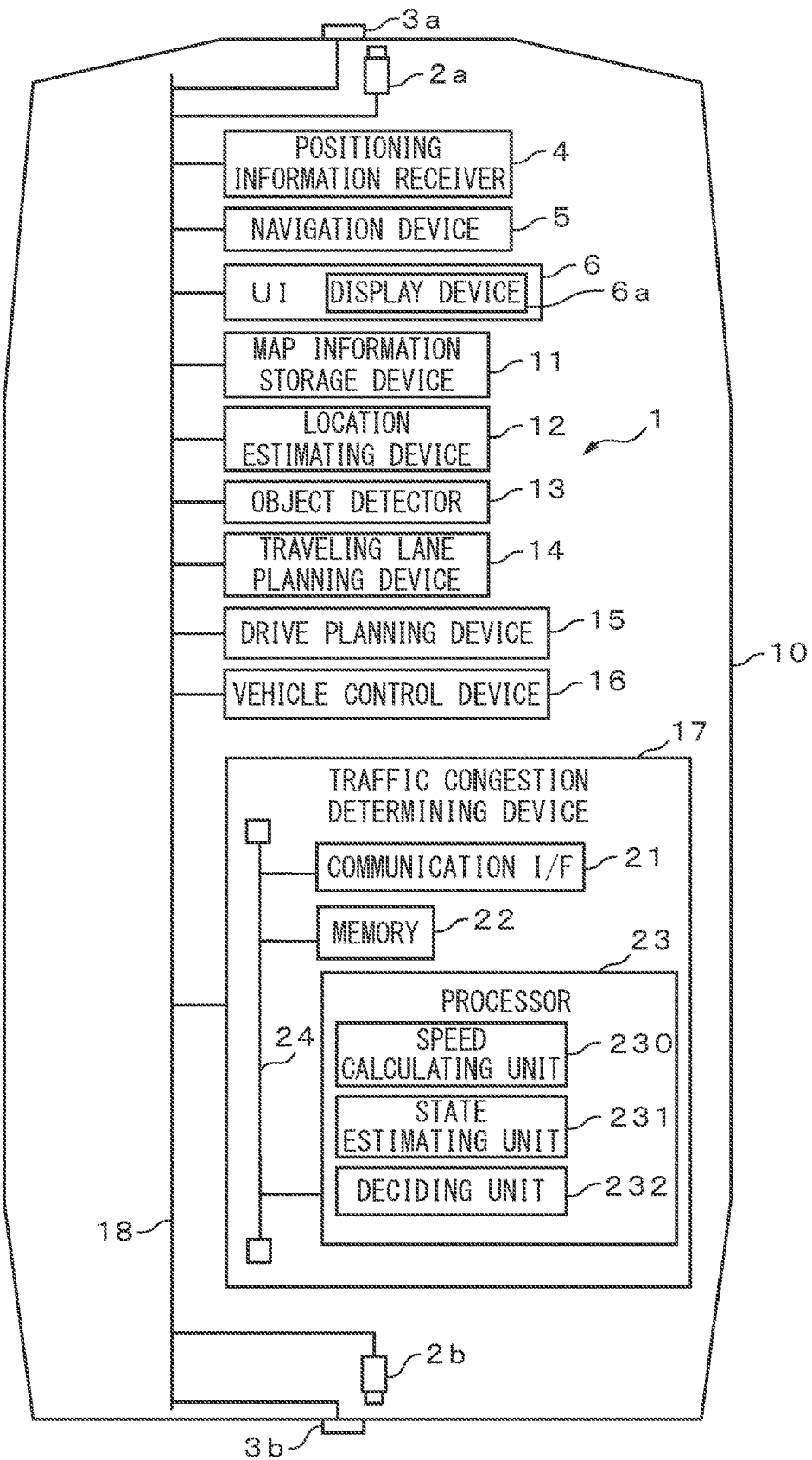
FIG. 2 is a general schematic drawing of a vehicle in which the traffic congestion determining device of the embodiment is mounted.

FIG. 2 is a general schematic drawing of a vehicle 10 in which the vehicle control system 1 is mounted. The vehicle control system 1 has cameras 2a, 2b, LiDAR sensors 3a, 3b, a positioning information receiver 4, a navigation device 5, a user interface (UI) 6, a map information storage device 11, a location estimating device 12, an object detector 13, a traveling lane planning device 14, a drive planning device 15, a vehicle control device 16 and a traffic congestion determining device 17. The vehicle control system 1 may also have a radar sensor, as another distance sensor (not shown) for measurement of the distance of the vehicle 10 to surrounding objects.

The cameras 2a, 2b, LiDAR sensors 3a, 3b, positioning information receiver 4, navigation device 5, UI 6, map information storage device 11, location estimating device 12, object detector 13, traveling lane planning device 14, drive planning device 15, vehicle control device 16 and traffic congestion determining device 17 are connected in a communicable manner through an in-vehicle network 18 that conforms to controller area network standards.

The cameras 2a, 2b are examples of imaging units provided in the vehicle 10. The camera 2a is mounted inside the vehicle 10 and directed toward the front of the vehicle 10. The camera 2b is mounted inside the vehicle 10 and directed toward the rear of the vehicle 10. Each of the cameras 2a, 2b, for example, captures a camera image in which the environment of a predetermined region ahead of or behind the vehicle 10 is shown, at a predetermined cycle. The camera image can show the road in the predetermined region ahead of or behind the vehicle 10, and road features such as surface lane marking lines on the road. A camera image captured by the camera 2a may also have other vehicles located at the left front, front and right front of the vehicle 10. A camera image captured by the camera 2b may have other vehicles located at the left rear, rear and right rear of the vehicle 10. The cameras 2a, 2b each have a 2D detector composed of an array of photoelectric conversion elements with visible light sensitivity, such as a CCD or C-MOS, and an imaging optical system that forms an image of the photographed region on the 2D detector.

Each time a camera image is captured, the cameras 2a, 2b output camera images and camera image photograph times at which the camera images were captured, through the in-vehicle network 18 to the location estimating device 12 and object detector 13. The camera images are also used for processing at the location estimating device 12 to estimate the location of the vehicle 10. At the object detector 13, the camera images are used for processing to detect other objects surrounding the vehicle 10.

Each of the LiDAR sensors 3a, 3b is mounted on the outer side of the vehicle 10, for example, being directed toward the front or rear of the vehicle 10. The LiDAR sensors 3a, 3b respectively synchronize and emit a pulsed laser ahead and to the rear of the vehicle 10, at a reflected wave information acquisition time set with a predetermined cycle, and receive a reflected wave that has been reflected from a reflector. The time required for the reflected wave to return contains information for the distance between the vehicle 10 and other objects located in the direction in which the laser has been emitted. Each of the LiDAR sensors 3a, 3b outputs the reflected wave information that includes the laser emission direction and the time required for the reflected wave to return, together with the reflected wave information acquisition time at which the laser was emitted, through the in-vehicle network 18 to the object detector 13. At the object detector 13, the reflected wave information is used for processing to detect other objects surrounding the vehicle 10.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, etc., each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. When the destination location has been newly set or the current location of the vehicle 10 has exited the navigation route, the navigation device 5 creates a new navigation route for the vehicle 10. Every time a navigation route is created, the navigation device 5 outputs the navigation route to the location estimating device 12 and the traveling lane planning device 14, etc., via the in-vehicle network 18.

The UI 6 is an example of the notification unit. The UI 6, controlled by the navigation device 5 and traffic congestion determining device 17, notifies the driver of the vehicle 10 traveling information and provides a control change notification indicating that operation of the vehicle 10 is to change from the manual control to the automatic control. The UI 6 also generates an operation signal in response to the operation of the vehicle 10 by the driver. The traveling information of the vehicle 10 includes information relating to the current location of the vehicle and the current and future route of the vehicle, such as the navigation route. The UI 6 has a display device 6a such as a liquid crystal display or touch panel, for display of the traveling information. The UI 6 may also have an acoustic output device (not shown) to notify the driver of traveling information. The UI 6 also has a touch panel or operating button, for example, as an input device for inputting operation information from the driver to the vehicle 10. The operation information may be, for example, a destination location, transit points, vehicle speed or other control information for the vehicle 10. The UI 6 outputs the input operation information to the navigation device 5, the vehicle control device 16 and the traffic congestion determining device 17, etc., via the in-vehicle network 18.

The map information storage device 11 stores wide-area map information for a relatively wide area (an area of 10 $km^2$ to 30 $km^2$, for example) that includes the current location of the vehicle 10. The map information preferably has high-precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 m² to 10 km²), through the in-vehicle network 18 to the location estimating device 12, object detector 13, traveling lane planning device 14, drive planning device 15, vehicle control device 16 and traffic congestion determining device 17, etc.

The location estimating device 12 estimates the location of the vehicle 10 at the camera image photograph time, based on the road features surrounding the vehicle 10 represented in the camera image captured by the camera 2a. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15, vehicle control device 16 and traffic congestion determining device 17, etc. The location estimating device 12 may estimate the location of the vehicle 10 based on the two camera images taken by the camera 2a and camera 2b.

The object detector 13 detects other objects at the left front, front and right front of the vehicle 10, and their type, based on the camera image captured by the camera 2a. The object detector 13 also detects other objects at the left rear, rear and right rear of the vehicle 10, and their type, based on the camera image captured by the camera 2b. Other objects also include other vehicles traveling around the vehicle 10. The object detector 13 has a classifier that detects objects represented in the camera image, by inputting the image, for example. The classifier may use a deep neural network (DNN) that has been trained to detect objects represented in input images, for example. The object detector 13 used may also be a classifier other than a DNN. For example, the classifier used by the object detector 13 may be a support vector machine (SVM) that has been trained to output a confidence factor for representation of objects to be detected in the window, with the input being a feature descriptor (such as Histogram of Oriented Gradients, HOG, for example) calculated from a window set in the camera image. Alternatively, the object detector 13 may detect an object region by template matching between the image and a template in which an object to be detected is represented.

The object detector 13 also detects other objects at the left front, front and right front of the vehicle 10, based on reflected wave information output by the LiDAR sensor 3a, and detects other objects at the left rear, rear and right rear of the vehicle 10, based on reflected wave information output by the LiDAR sensor 3b. The object detector 13 can also determine the orientation of another object with respect to the vehicle 10 based on the location of the other object in the camera image, and may determine the distance between the other object and the vehicle 10, based on the orientation and on the reflected wave information output by the LiDAR sensors 3a, 3b. The object detector 13 estimates the location of the other object represented in a world coordinate system based on the current location of the vehicle 10, and the distance of the other object from the vehicle 10 and its orientation, for example. The object detector 13 also tracks other objects to be detected from an updated image, by matching other objects detected in the updated camera image with objects detected in previous images, according to a tracking process based on optical flow. The object detector 13 also calculates the trajectory of another object being tracked, based on the location of the object in an image updated from a previous image, represented in the world coordinate system. The object detector 13 estimates the speed of another object with respect to the vehicle 10, based on changes in the location of the object over the course of time. The object detector 13 can also estimate the acceleration of another object based on changes in the speed of the object over the course of time. In addition, the object detector 13 identifies the traveling lanes in which the other objects are traveling, based on the lane marking lines represented in the map information and the locations of the objects. The object detector 13 also determines, for example, whether another object is traveling in a traffic lane defined by two mutually adjacent lane marking lines situated on either side of the center location of the other object in the lateral direction. The object detector 13 outputs object detection information which includes information representing the types of other objects that were detected, information indicating their locations, and also information indicating their speeds, accelerations and traveling lanes, to the traveling lane planning device 14, drive planning device 15, vehicle control device 16 and traffic congestion determining device 17, etc. The detection area in which other objects can be detected by the object detector 13 is set based on the conditions and resolving power of the cameras 2a, 2b and LiDAR sensors 3a, 3b.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the traveling lane plan to the drive planning device 15.

The traveling lane planning device 14 also determines whether or not a lane change is necessary within the nearest driving zone selected from the navigation route, based on the traveling lane plan, the map information, the navigation route and the current location of the vehicle 10, and generates a lane change plan in accordance with the assessment results. The lane change plan includes a lane change schedule zone in the lane in which the vehicle 10 is traveling, where it is scheduled to move to an adjacent lane. Specifically, the traveling lane planning device 14 determines whether or not a lane change is necessary for moving to a traffic lane toward the destination location of the vehicle 10, based on the navigation route and the current location of the vehicle 10. The traveling lane planning device 14 determines whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The traveling lane planning device 14 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. The traveling lane planning device 14 also generates a lane change plan in response to a driver request. Information indicating the speed of the vehicle 10 and its acceleration is acquired using a sensor (not shown) mounted on the vehicle 10.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other vehicles. The drive planning device 15 outputs the driving plan to the vehicle control device 16 for each driving plan generated.

The vehicle control device 16 has the automatic control operating mode in which the vehicle 10 is operated by the automatic control, and the manual control operating mode in which the driver operates the vehicle manually. When the automatic control operating mode has been applied, the vehicle control device 16 enables the automatic control of all vehicle operation including driving, braking and steering, based on the driving plan.

When the vehicle 10 is operated in the automatic control operating mode, the vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 18. The vehicle control device 16 also determines the amount of fuel injection according to a set accelerator level, and outputs a control signal corresponding to the amount of fuel injection to a drive unit (not shown) of the engine of the vehicle 10, via the in-vehicle network 18. Alternatively, the vehicle control device 16 may output a control signal corresponding to a set brake level to the brake (not shown) of the vehicle 10, via the in-vehicle network 18.

In the manual control operating mode, on the other hand, the driver can use the steering wheel, accelerator pedal and brake pedal (not shown) for traveling by the manually controlled operation of the vehicle. When the vehicle 10 is operated by the manual control, the vehicle control device 16 controls the steering wheel, drive unit or brake according to the amount of driver-operated steering, accelerator or brake level. In the manual control operating mode, at least one operation of the vehicle 10 from among driving, braking and steering is controlled manually. A change from the automatic control to manual control is possible, depending on the request by the driver.

When the vehicle control device 16 in the automatic control operating mode has judged that the vehicle 10 cannot safely travel by the automatic control, and the driver has acknowledged the control change notification that a change from the automatic control to the manual control is required, operation of the vehicle 10 is switched from the automatic control operating mode to the manual control operating mode. Under conditions where the vehicle 10 cannot safely travel by the automatic control, therefore, the driver can use the steering wheel, accelerator pedal and brake pedal (not shown) for traveling by the manually controlled operation of the vehicle. The driver may also notify the vehicle control device 16 of a control change request for request of a change from the automatic control to the manual control, to switch the operation of the vehicle 10 from the automatic control operating mode to the manual control operating mode.

When the vehicle control device 16 in the manual control operating mode has estimated that the entire road in which the vehicle 10 is traveling is congested, it gives the driver a control change notification proposing a change from the manual control to the automatic control. Once the control change notification has been acknowledged by the driver, the vehicle control device 16 switches the operation of the vehicle 10 from the currently applied manual control operating mode to the automatic control operating mode. As a result, the operation of the vehicle is controlled by the vehicle control device 16, releasing the driver from the burden of driving the vehicle when the road is congested.

The traffic congestion determining device 17 carries out speed calculation processing, state estimation processing and decision processing. For this purpose, the traffic congestion determining device 17 has a communication interface (IF) 21, a memory 22 and a processor 23. The communication interface 21, memory 22 and processor 23 are connected via signal wires 24. The communication interface 21 has an interface circuit to connect the traffic congestion determining device 17 with the in-vehicle network 18.

All or some of the functions of the traffic congestion determining device 17 are functional modules driven by a computer program operating on the processor 23, for example. The processor 23 has a speed calculating unit 230, a state estimating unit 231 and a selecting unit 232. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23 of each device. Other details regarding operation of the traffic congestion determining device 17 are described below.

In FIG. 2, the map information storage device 11, location estimating device 12, object detector 13, traveling lane planning device 14, drive planning device 15, vehicle control device 16 and traffic congestion determining device 17, were explained as separate devices, but all or some of them may be constructed in a single device.

Figure 3:
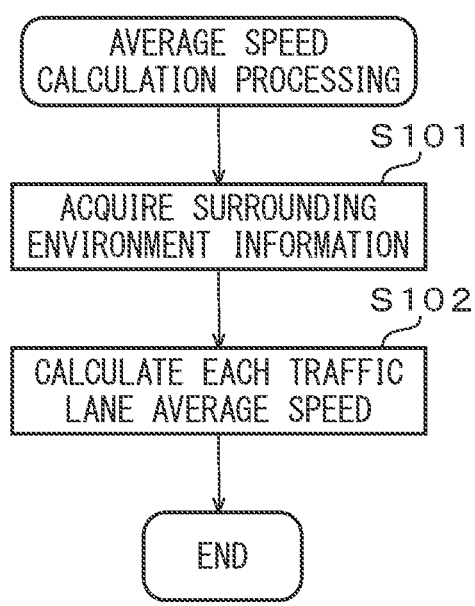
FIG. 3 is an example of an operation flow chart for average speed calculation processing by a traffic congestion determining device of the embodiment.

FIG. 3 is an example of an operation flow chart for average speed calculation processing by the traffic congestion determining device 17 of the embodiment. The average speed calculation processing by the traffic congestion determining device 17 will now be explained with reference to FIG. 3. The traffic congestion determining device 17 carries out the average speed calculation processing according to the operation flow chart shown in FIG. 3, at an average speed calculating time having a predetermined cycle.

First, the speed calculating unit 230 acquires the speeds of the other vehicles traveling in the traffic lanes of the road on which the vehicle 10 is traveling, from the object detector 13, as surrounding environment information (step S101). The speed calculating unit 230 also acquires information indicating the speed of the vehicle 10, as vehicle status information, from a sensor (not shown) mounted on the vehicle 10.

The speed calculating unit 230 then calculates the traffic lane average speed for each traffic lane of the road on which the vehicle 10 is traveling, within a predetermined range L from the vehicle 10, and the series of processing steps is complete (step S102). Based on map information, the speed calculating unit 230 acquires the number of traffic lanes on the road on which the vehicle 10 is traveling. The speed calculating unit 230 also acquires the speeds of the other vehicles traveling in each of the traffic lanes of the road on which the vehicle 10 is traveling, from the object detector 13. The predetermined range L corresponds to a detection range in which the object detector 13 is able to detect other vehicles.

From among the traffic lanes of the road on which the vehicle 10 is traveling, the speed calculating unit 230 calculates the average value for the speeds of the other vehicles traveling on traffic lanes other than the traffic lane in which the vehicle 10 is traveling, as the traffic lane average speed for each. For the traffic lane in which the vehicle 10 is traveling, the speed calculating unit 230 calculates the average value for the speed of the vehicle 10 and the speeds of the other vehicles traveling in that traffic lane, as the traffic lane average speed. The speed calculating unit 230 may also use the most recent average speed for each vehicle as the speed of the vehicle 10 and the speeds of the other vehicles. The most recent average speed may be the average speed for the previous 5 to 10 seconds, for example. When the road on which the vehicle 10 is traveling has only a single lane, the speed calculating unit 230 calculates the traffic lane average speed for the lane in which the vehicle 10 is traveling.

Figure 4:
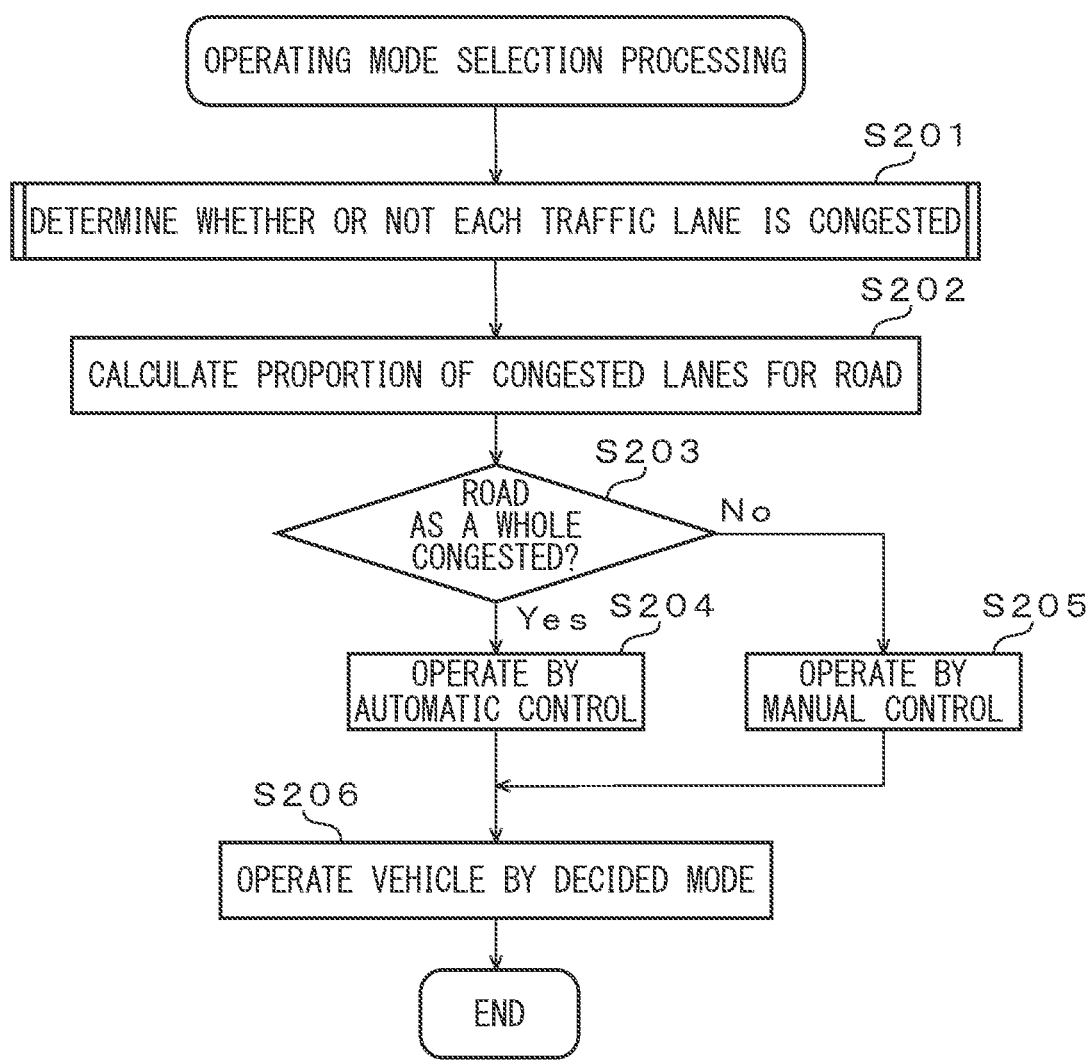
FIG. 4 is an example of an operation flow chart for operating mode selection processing by a traffic congestion determining device of the embodiment.

FIG. 4 is an example of an operation flow chart for operating mode selection processing by the traffic congestion determining device 17 of the embodiment. The operating mode selection processing by the traffic congestion determining device 17 will now be explained with reference to FIG. 4. When the vehicle 10 is being operated in the manual control operating mode, the traffic congestion determining device 17 carries out vehicle the control processing according to the operation flow chart shown in FIG. 4, at an operating mode selection time having a predetermined cycle. The cycle for the operating mode selection time is preferably equal to or longer than the cycle for the average speed calculating time.

First, the state estimating unit 231 determines whether or not the traffic lanes are congested based on the traffic lane average speed for each of the multiple traffic lanes of the road on which the vehicle 10 is traveling (step S201). The state estimating unit 231 determines that traffic lanes without any other traveling vehicles, among the traffic lanes other than the traffic lane in which the vehicle 10 is traveling, are non-congested traffic lanes. When the road on which the vehicle 10 is traveling has only a single lane, the state estimating unit 231 determines whether or not the traffic lane in which the vehicle 10 is traveling is congested. The details regarding traffic congestion determination processing by the state estimating unit 231 will be described below.

The state estimating unit 231 then calculates the proportion P of congested lanes within the road on which the vehicle 10 is traveling (step S202). For example, the state estimating unit 231 calculates the proportion P of congested lanes to be the number n of traffic lanes determined to be congested among the traffic lanes of the road on which the vehicle 10 is traveling, divided by the number m of traffic lanes of the road on which the vehicle 10 is traveling (n/m), multiplied by 100 (n/m*100).

The state estimating unit 231 then estimates whether or not the road as a whole is congested, based on the proportion P of congested lanes in the road on which the vehicle 10 is traveling (step S203). The state estimating unit 231 determines that the road as a whole is congested when the proportion P of congested lanes in the road on which the vehicle 10 is traveling is at least a predetermined reference proportion. The predetermined reference proportion may be 50%, for example. However, the predetermined reference proportion may alternatively be a different value.

The state estimating unit 231 may also change the predetermined reference proportion based on the most recent average speed of the vehicle 10. When the average speed of the vehicle 10 is faster than the predetermined reference speed, the predetermined reference proportion (such as 50%) may be changed to a lower value. When the average speed of the vehicle 10 is slower than the predetermined reference speed, on the other hand, the predetermined reference proportion (such as 50%) may be changed to a higher value.

When the road as a whole is congested (step S203—Yes), the deciding unit 232 decides to operate the vehicle 10 by the automatic control (step S204). The deciding unit 232 selects the operation of the vehicle 10 in the automatic control operating mode. Since the vehicle 10 is currently being operated in the manual control operating mode, the deciding unit 232 gives the driver of a control change notification via the UI 6, proposing to switch from the manual control to the automatic control. Once the control change notification has been acknowledged by the driver through the UI 6, the deciding unit 232 controls the vehicle control device 16 so as to begin operation of the vehicle 10 in the automatic control operating mode (step S206). When the control change notification has not been acknowledged by the driver through the UI 6, the vehicle control device 16 continues the current state of control of the vehicle 10 in the manual control operating mode.

When the road as a whole is not congested (step S203—No), on the other hand, the deciding unit 232 decides to operate the vehicle 10 by the manual control (step S205). The deciding unit 232 selects the control of the vehicle 10 in the manual control operating mode.

The vehicle control device 16 continues the current state of control of the vehicle 10 in manual control operating mode (step S206).

Figures 5, 6:
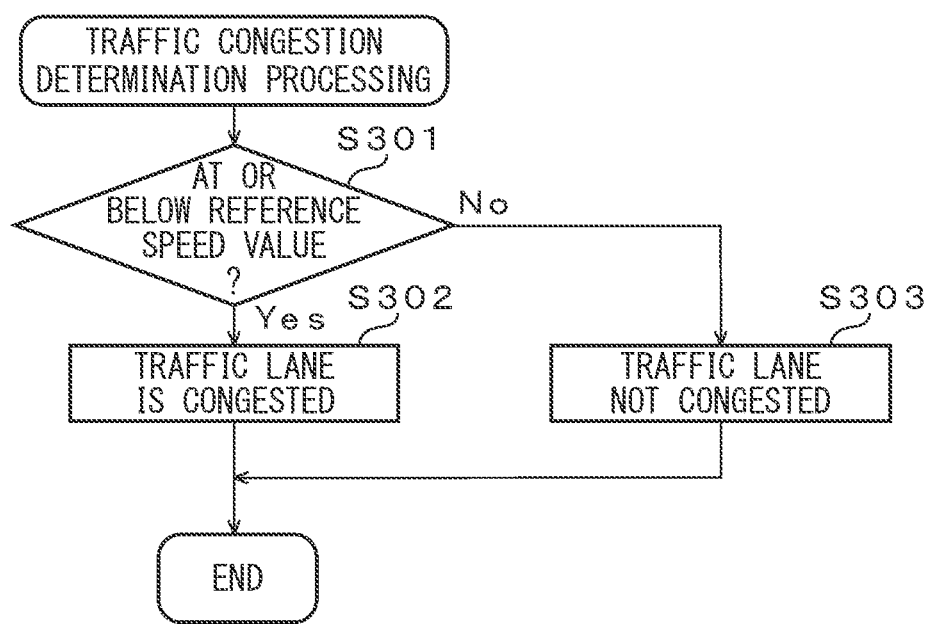
FIG. 5 is an example of an operation flow chart for traffic congestion determination processing by a traffic congestion determining device according to the embodiment.
FIG. 6 is a table showing reference speed values set for each traffic lane.

FIG. 5 is an example of an operation flow chart for traffic congestion determination processing by the traffic congestion determining device 17 of the embodiment. The traffic congestion determination processing by the state estimating unit 231 will now be described with reference to FIG. 4.

First, the state estimating unit 231 determines whether or not the traffic lane average speed is at or below the reference speed value set for each traffic lane, for each of the multiple traffic lanes of the road 50 on which the vehicle 10 is traveling (step S301).

When the traffic lane average speed is at or below the reference speed value set for each traffic lane (step S301—Yes), the state estimating unit 231 determines that the traffic lane is congested (step S302).

If the traffic lane average speed is not at or below the reference speed value set for each traffic lane (step S301—No), on the other hand, the state estimating unit 231 determines that the traffic lane is not congested (step S303).

FIG. 6 is a table showing reference speed values set for each traffic lane. When the road 50 on which the vehicle 10 is traveling has three traffic lanes 51, 52, 53, as in the example shown in FIG. 1, the state estimating unit 231 sets a reference decrease for each of the left traffic lane 51, center traffic lane 52 and passing lane 53. The state estimating unit 231 sets the reference decrease at a reference decrease setting time having a predetermined reference decrease setting cycle (an example of a predetermined reference time).

The state estimating unit 231 sets the reference speed value for each traffic lane based on the average value for the traffic lane average speed during the reference decrease setting cycle for each of the left traffic lane 51, center traffic lane 52 and passing lane 53. The state estimating unit 231 acquires the traffic lane average speed during the reference decrease setting cycle from the speed calculating unit 230, and calculates the average value for the traffic lane average speed. The reference decrease is preferably set to be larger for a greater average value for the traffic lane average speed. In the example shown in FIG. 6, the reference decrease is set to be 30% of the average value for the traffic lane average speed. The proportion of reference decrease with respect to the average value for the traffic lane average speed is not limited to this example.

The reference decrease setting cycle may be a fixed time period. The fixed time period may be 5 to 10 minutes, for example. The reference decrease setting cycle may also be decided by changing the fixed time based on the most recent average speed of the vehicle 10. In this case, the reference decrease setting cycle may be changed so as to be a longer fixed time when the most recent average speed of the vehicle 10 is slower.

The state estimating unit 231 sets the reference speed value for each traffic lane to be the value of the reference decrease subtracted from the traffic lane average speed, for each of the left traffic lane 51, center traffic lane 52 and passing lane 53.

Figure 7:
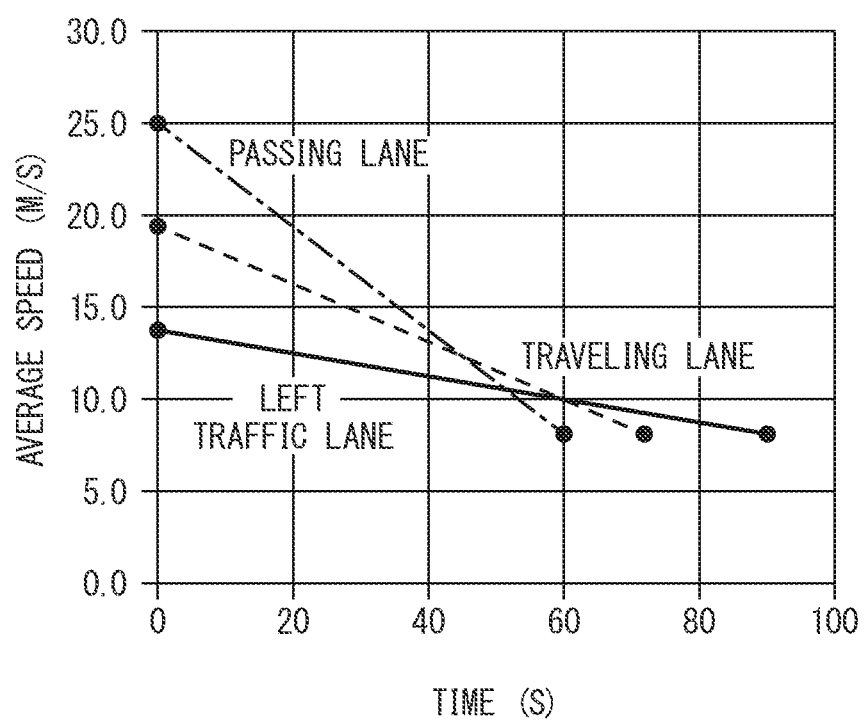
FIG. 7 is a diagram illustrating an example of traffic congestion determination processing.

FIG. 7 is a diagram illustrating an example of traffic congestion determination processing. In the example shown in FIG. 6, the road on which the vehicle 10 is traveling has a left traffic lane, a center traffic lane and a passing lane, the left traffic lane average speed being 50 km/h (13.8 m/s), the center traffic lane average speed being 70 km/h (19.4 m/s) and the passing traffic lane average speed being 90 km/h (25 m/s). The road is congested 1 km ahead of the current location of the vehicle 10, where the average speed is 30 km/h (8.3 m/s) for the entire road.

As shown in FIG. 7, the amount of change in each traffic lane average speed in the range up to 1 km ahead of the current location of the vehicle 10 is larger in the order: left traffic lane, center traffic lane, passing lane. In other words, the amount of change in the traffic lane average speed is greater with a faster average speed at the current location of the vehicle 10. By concentrating on the change in speed in the traffic lane with faster average speed, therefore, it is possible to more rapidly detect development of traffic congestion. The size of the reference decrease is thus set to be larger for a higher traffic lane average speed, as mentioned above. The size of the reference decrease will generally be larger in the order: left traffic lane, center traffic lane, passing lane.

A specific example of operation of the traffic congestion determining device 17 will now be explained with reference to FIG. 1, FIG. 8 and FIG. 9.

In the example shown in FIG. 1, the state estimating unit 231 determines that each of the three traffic lanes 51, 52, 53 of the road 50 are congested. Since the proportion P of congested lanes in the road on which the vehicle 10 is traveling (100%) is greater than the predetermined reference proportion (50%, for example), the state estimating unit 231 determines that the road as a whole is congested. Since the road 50 as a whole is congested, the deciding unit 232 decides to operate the vehicle 10 by the automatic control and selects control of the vehicle 10 by the automatic control operating mode. The deciding unit 232 notifies the driver that the operation will be switched from the manual control operating mode to the automatic control operating mode, and controls the vehicle control device 16 so as to start the control of the vehicle 10 in the selected automatic control operating mode. Since the traffic congestion determining device 17 estimates the state of the entire road on which the vehicle is traveling based on the average speed of each of its multiple lanes, it can rapidly detect the start of congestion for the entire road, and this can be reflected in control of the vehicle 10.

Figure 8:
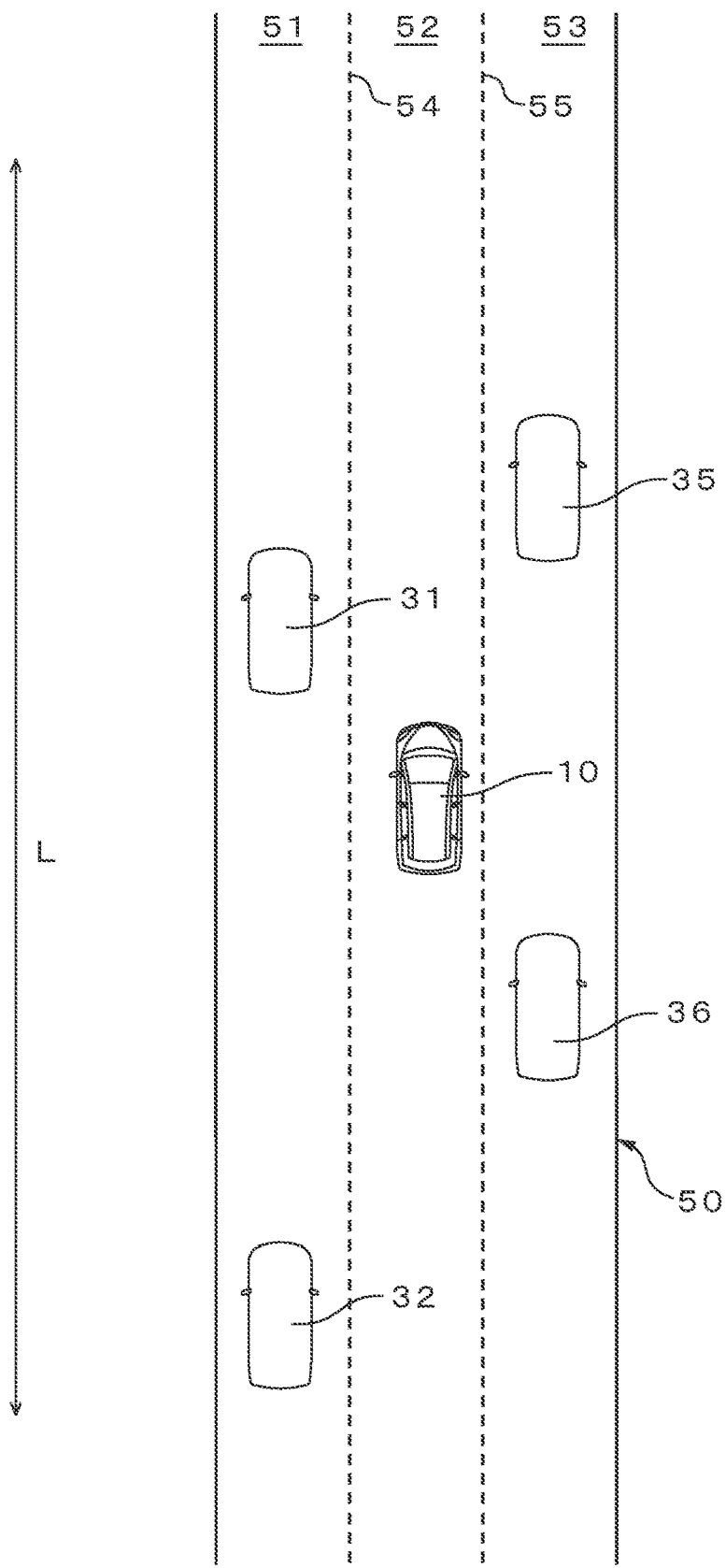
FIG. 8 is a diagram illustrating an example of traffic congestion determination processing.

In the example shown in FIG. 8, from among the three traffic lanes 51, 52, 53 of the road 50, the state estimating unit 231 determines that the traffic lane 51 and traffic lane 53 are congested and that the traffic lane 52 in which the vehicle 10 is traveling is not congested. Since the proportion P of congested lanes in the road on which the vehicle 10 is traveling (67%) is greater than the predetermined reference proportion (50%, for example), the state estimating unit 231 determines that the road as a whole is congested. Since the road 50 as a whole is congested, the deciding unit 232 decides to operate the vehicle 10 by the automatic control and selects the control of the vehicle 10 by the automatic control operating mode. The deciding unit 232 notifies the driver that the operation will be switched from the manual control operating mode to the automatic control operating mode, and controls the vehicle control device 16 so as to start the control of the vehicle 10 in the selected the automatic control operating mode. Since the traffic lane 51 and traffic lane 53 are congested, even though the traffic lane 52 in which the vehicle 10 is traveling is not congested, the traffic congestion determining device 17 estimates that the road 50 as a whole is congested, and can rapidly detect the start of congestion of the road as a whole, which may be reflected in control of the vehicle 10.

Figure 9:
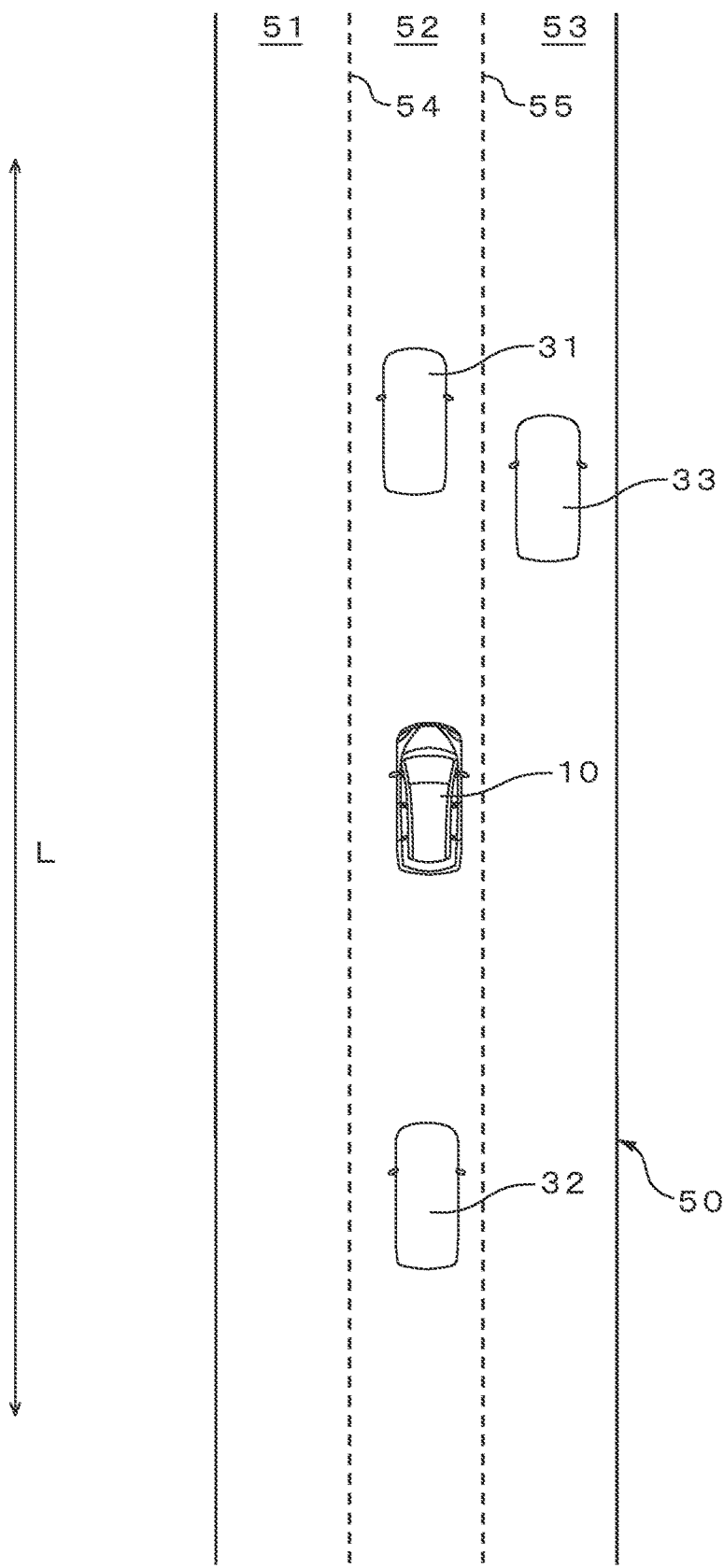
FIG. 9 is a diagram illustrating another example of traffic congestion determination processing.

In the example shown in FIG. 9, from among the three traffic lanes 51, 52, 53 of the road 50, the state estimating unit 231 determines that the traffic lane 52 in which the vehicle 10 is traveling is congested, and that the traffic lane 51 and traffic lane 53 are not congested. Since the proportion P of congested lanes in the road on which the vehicle 10 is traveling (33%) is less than the predetermined reference proportion (50%, for example), the state estimating unit 231 determines that the road as a whole is not congested. Since the road 50 as a whole is not congested, the deciding unit 232 selects the control of the vehicle 10 by the manual control operating mode. The vehicle control device 16 continues the current state of the control of the vehicle 10 in the manual control operating mode. Since the traffic lane 51 and traffic lane 53 are not congested, even though the traffic lane 52 in which the vehicle 10 is traveling is congested, the traffic congestion determining device 17 estimates that the road as a whole is not congested, and can accurately detect the state of the road as a whole which may be reflected in control of the vehicle 10.

Since the vehicle control device of this embodiment estimates the overall state of the road on which the vehicle is traveling based on the average speed of each of its multiple lanes, as explained above, the vehicle control device can appropriately reflect the state of the road as a whole for controlling the vehicle.

For the embodiment described above, the state estimating unit 231 had a fixed reference speed value used for determining whether or not the traffic lanes are congested. However, when the traveling road of the vehicle 10 has a branching location where another road branches off allowing another vehicle to exit from the traveling road of the vehicle 10 (such as an interchange exit or junction-connecting branch road), then the traffic lane average speed may be expected to increase as the other vehicle exits onto the branching road. In such cases, a fixed reference speed value can potentially prevent accurate detection of the state of the road as a whole. The vehicle control device may therefore change the reference speed value when a branching road is present ahead of the current location of the vehicle 10, as explained below.

Figure 10:
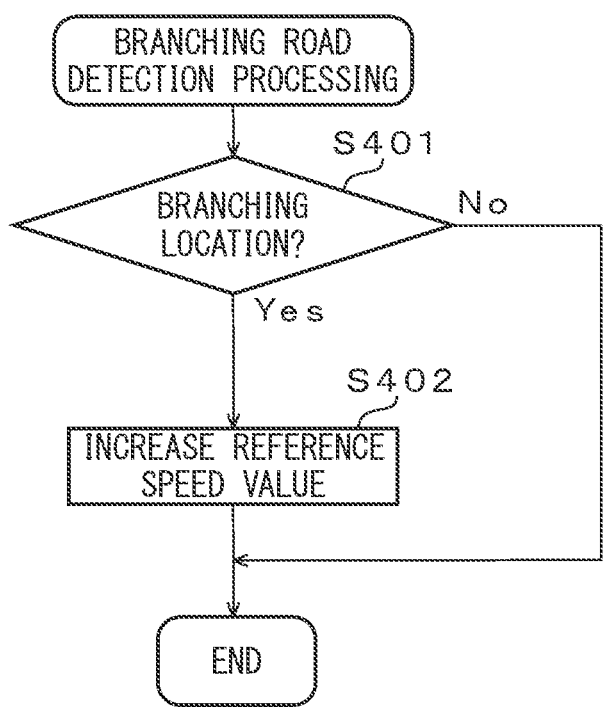
FIG. 10 is an example of an operation flow chart for branching road detection processing by a traffic congestion determining device.

FIG. 10 is an example of an operation flow chart for branching road detection processing by a traffic congestion determining device 17. The traffic congestion determining device 17 carries out the branching road detection processing shown in FIG. 10 at a branching road detection time having a predetermined cycle.

First, based on the current location of the vehicle 10 and map information, the state estimating unit 231 determines whether or not the branching location is within a predetermined range M (such as 5 km) from the current location of the vehicle 10 in the traveling direction (step S401).

Figure 11:
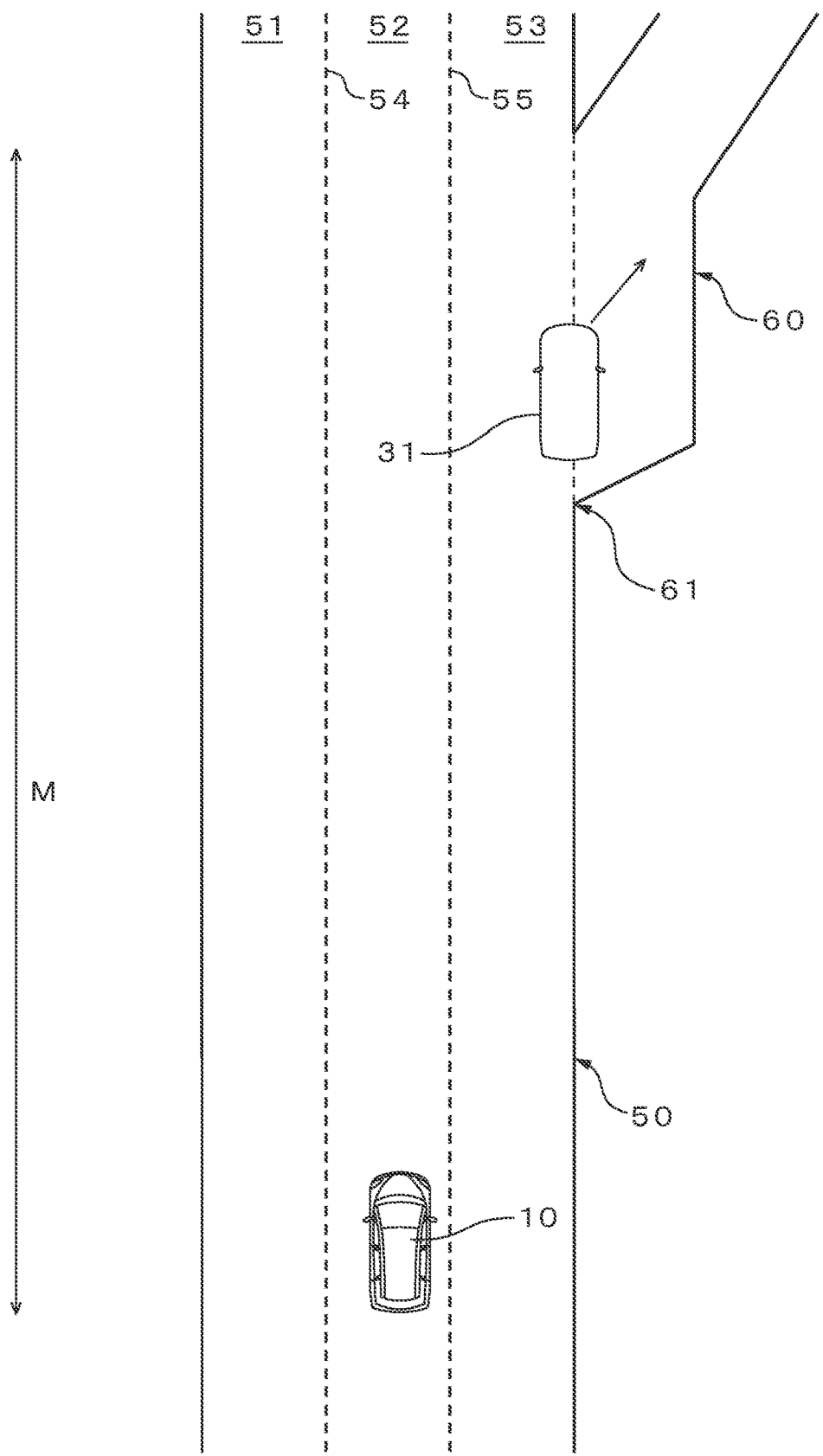
FIG. 11 is a diagram illustrating branching road detection processing by a traffic congestion determining device.

FIG. 11 is a diagram illustrating branching road detection processing by the traffic congestion determining device 17. The branching location 61 where a branching road 60 branches from the road 50 is within a first range M from the current location of the vehicle 10 in the traveling direction. Another vehicle 31 can exit from the road 50 at the branching location 61.

When a branching location exists within the predetermined range M from the current location of the vehicle 10 in the traveling direction (step S401—Yes), the state estimating unit 231 increases the reference speed value for each of the multiple traffic lanes of the road on which the vehicle 10 is traveling, and the series of processing steps is complete (step S402).

When no branching location exists within the predetermined range M from the current location of the vehicle 10 in the traveling direction (step S401—No), on the other hand, the state estimating unit 231 completes the series of processing steps (step S403).

After the vehicle 10 has passed the branching location, the state estimating unit 231 returns the reference speed value to the original value before increase.

When another road where another vehicle can enter the traveling road of the vehicle 10 (such as an interchange entrance or junction-connecting merging road) exists at a merging location that merges with the traveling road of the vehicle 10, then the traffic lane average speed may be expected to decrease as the other vehicle enters from the merging road to the traveling road of the vehicle 10. In such cases, a fixed reference speed value can potentially prevent accurate detection of the state of the road as a whole. The vehicle control device may therefore change the reference speed value when a merging road is present ahead of the current location of the vehicle 10, as explained below.

Figure 12:
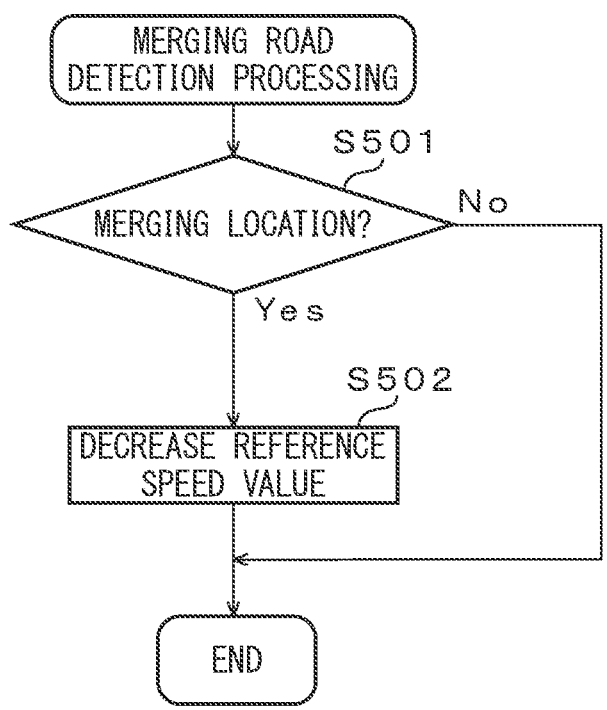
FIG. 12 is an example of an operation flow chart for merging road detection processing by a traffic congestion determining device.

FIG. 12 is an example of an operation flow chart for merging road detection processing by a traffic congestion determining device 17. The traffic congestion determining device 17 carries out the merging road detection processing shown in FIG. 12 at a merging road detection time having a predetermined cycle.

First, based on the current location of the vehicle 10 and map information, the state estimating unit 231 determines whether or not the merging location is within a predetermined range (such as 5 km) from the current location of the vehicle 10 in the traveling direction (step S501).

Figure 13:
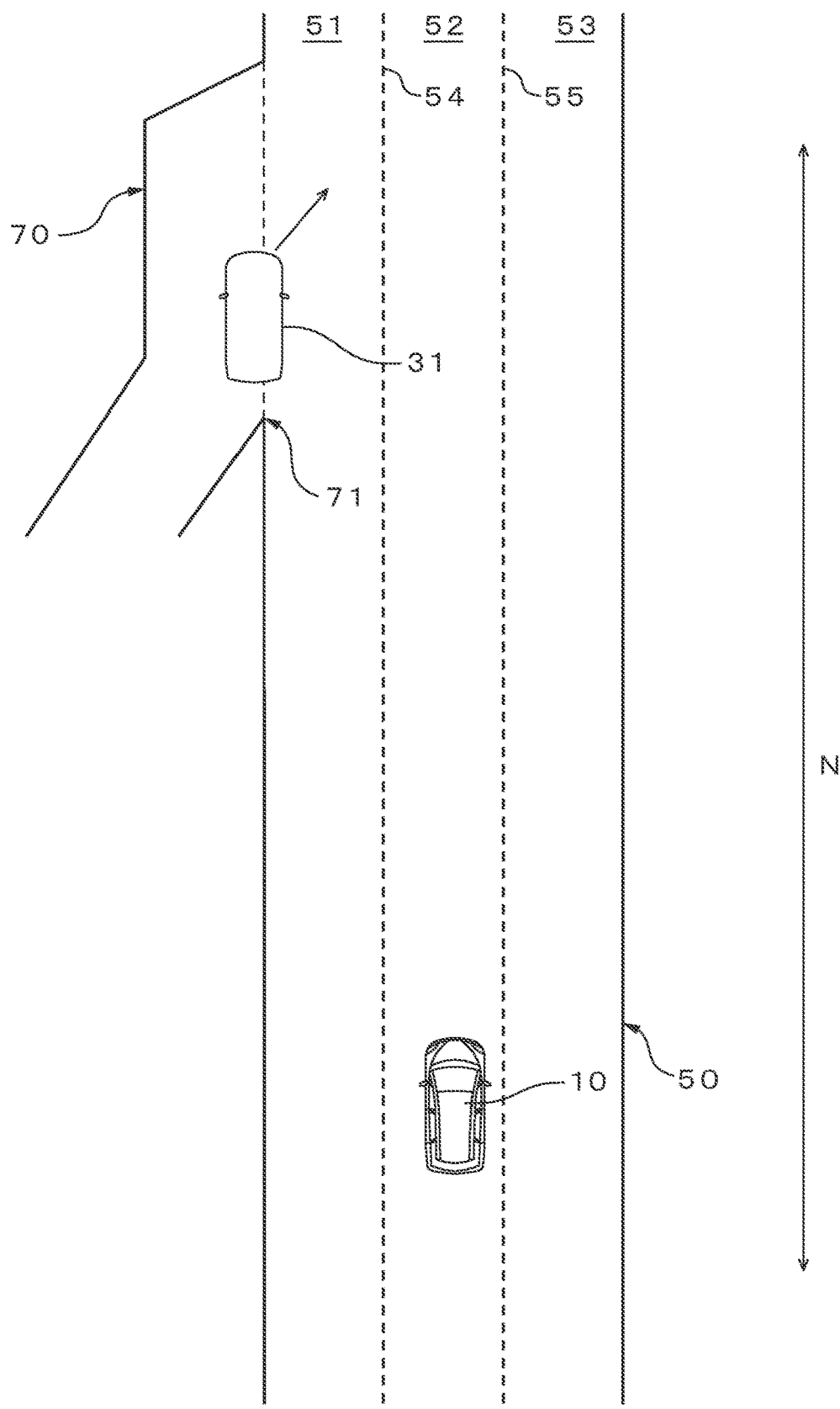
FIG. 13 is a diagram illustrating merging road detection processing by a traffic congestion determining device.

FIG. 13 is a diagram illustrating merging road detection processing by a traffic congestion determining device 17. The merging location 71 where a merging road 70 merges onto the road 50 is within a predetermined range N from the current location of the vehicle 10 in the traveling direction. Another vehicle 31 can enter onto the road 50 at the merging location 61.

When a merging location exists within the predetermined range from the current location of the vehicle 10 (step S501—Yes), the state estimating unit 231 decreases the reference speed value for each of the multiple traffic lanes of the road on which the vehicle 10 is traveling, and the series of processing steps is complete (step S502).

When no merging location exists within the predetermined range from the current location of the vehicle 10 (step S501—No), on the other hand, the state estimating unit 231 completes the series of processing steps (step S503).

After the vehicle 10 has passed the merging location, the state estimating unit 231 returns the reference speed value to the original value before decrease.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

The invention claimed is:

1. A vehicle control device comprising:
a processor configured to
calculate an average speed of a vehicle traveling in a traffic lane and another vehicle in a predetermined range from the vehicle, for each of multiple traffic lanes of a traveling road on which the vehicle is traveling, as a traffic lane average speed,
determine whether the traffic lanes are congested based on the traffic lane average speed for each of the multiple traffic lanes of the traveling road and estimate whether the traveling road as a whole is congested based on a proportion of traffic lanes of the traveling road that are congested, and control the vehicle by automatic control when the traveling road as a whole is congested;
and wherein the processor is further configured to:
determine that the traveling road as a whole is congested when the proportion of congested lanes in the traveling road is equal to or above a predetermined reference proportion, and change the predetermined reference proportion based on the average speed of the vehicle.

2. The vehicle control device according to claim 1, wherein the processor is further configured to determine, for each of the multiple traffic lanes of the traveling road, that the traffic lane is congested when the traffic lane average speed is at or below a reference speed value set for each traffic lane.

3. The vehicle control device according to claim 2, wherein the processor is further configured to set the reference speed value for each traffic lane based on the average value for the traffic lane average speed between predetermined reference time points, for each of the multiple traffic lanes of the traveling road.

4. The vehicle control device according to claim 2, wherein the processor is further configured to increase the reference speed value for each of the multiple traffic lanes of the traveling road, when a branching location where another road branches from the traveling road is within a first range from the current location of the vehicle toward the traveling direction.

5. The vehicle control device according to claim 2, wherein the processor is further configured to decrease the reference speed value for each of the multiple traffic lanes of the traveling road, when a merging location where another road merges with the traveling road is within a second range from the current location of the vehicle toward the traveling direction.

6. A computer-readable, non-transitory storage medium storing a computer program for vehicle control, which causes a processor to execute a process, the process comprising:

calculating an average speed of a vehicle traveling in a traffic lane and another vehicle in a predetermined range from the vehicle, for each of multiple traffic lanes of a traveling road on which the vehicle is traveling, as a traffic lane average speed;

determining whether the traffic lanes are congested based on the traffic lane average speed for each of the multiple traffic lanes of the traveling road and estimating whether the traveling road as a whole is congested based on a proportion of traffic lanes of the traveling road that are congested;

controlling the vehicle by automatic control when the traveling road as a whole is congested;

determining that the traveling road as a whole is congested when the proportion of congested lanes in the traveling road is equal to or above a predetermined reference proportion; and changing the predetermined reference proportion based on the average speed of the vehicle.

7. A method for controlling a vehicle carried out by a vehicle control device, the method comprising:

calculating an average speed of a vehicle traveling in a traffic lane and another vehicle in a predetermined range from the vehicle, for each of multiple traffic lanes of a traveling road on which the vehicle is traveling, as a traffic lane average speed;

determining whether the traffic lanes are congested based on the traffic lane average speed for each of the multiple traffic lanes of the traveling road and estimating whether the traveling road as a whole is congested based on a proportion of traffic lanes of the traveling road that are congested;

controlling the vehicle by automatic control when the traveling road as a whole is congested;

determining that the traveling road as a whole is congested when the proportion of congested lanes in the traveling road is equal to or above a predetermined reference proportion; and changing the predetermined reference proportion based on the average speed of the vehicle.

\* \* \* \* \*